United States Patent
Dai et al.

(10) Patent No.: US 9,210,350 B2
(45) Date of Patent: Dec. 8, 2015

(54) LOW POWER IMAGING SYSTEM WITH SINGLE PHOTON AVALANCHE DIODE PHOTON COUNTERS AND GHOST IMAGE REDUCTION

(71) Applicant: OMNIVISION TECHNOLOGIES, INC., Santa Clara, CA (US)

(72) Inventors: Tiejun Dai, Santa Clara, CA (US); Rui Wang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 100 days.

(21) Appl. No.: 14/100,941

(22) Filed: Dec. 9, 2013

(65) Prior Publication Data

US 2015/0163429 A1    Jun. 11, 2015

(51) Int. Cl.
*H04N 5/235*    (2006.01)
*H04N 5/228*    (2006.01)
*H04N 5/225*    (2006.01)
*H04N 5/378*    (2011.01)
*H04N 5/355*    (2011.01)
*H04N 5/353*    (2011.01)

(52) U.S. Cl.
CPC ............. *H04N 5/378* (2013.01); *H04N 5/3535* (2013.01); *H04N 5/35572* (2013.01)

(58) Field of Classification Search
CPC .... A61B 6/4266; A61B 5/0071; A61B 10/02; A61B 18/20; A61B 1/041; A61B 1/043; A61B 2562/0242; A61B 5/0062; A61B 5/0075; G01N 2201/06113; G01N 2201/062; G01T 1/247; G01T 7/0012; Y10S 977/774
USPC .............. 348/221.1, 222.1, 229.1, 231.6, 234
See application file for complete search history.

(56) References Cited

U.S. PATENT DOCUMENTS

2011/0080510 A1*  4/2011  Nishihara ..................... 348/308

* cited by examiner

*Primary Examiner* — Trung Diep
(74) *Attorney, Agent, or Firm* — Blakely Sokoloff Taylor & Zafman LLP

(57) ABSTRACT

An imaging system includes a pixel array including a plurality of pixels. Each one of the pixels includes a single photon avalanche diode (SPAD) coupled to detect photons in response to incident light. A photon counter included in readout circuitry coupled to each pixel to count a number of photons detected by each pixel. The photon counter is coupled to stop counting photons in each pixel when a threshold photon count is reached for each pixel. Control circuitry is coupled to the pixel array to control operation of the pixel array. The control circuitry includes an exposure time counter coupled to count a number of exposure times elapsed before each pixel detects the threshold photon count. Respective exposure time counts and photon counts are combined for each pixel of the pixel array.

18 Claims, 4 Drawing Sheets

LOW POWER IMAGING SYSTEM WITH SINGLE PHOTON AVALANCHE DIODE PHOTON COUNTERS AND GHOST IMAGE REDUCTION

BACKGROUND INFORMATION

1. Field of the Disclosure

The present invention relates generally to photodetectors, and more specifically, the present invention is directed to imaging systems including photon counters.

2. Background

A silicon photomultiplier (SiPM) is one type of photodetector that is capable of detecting a low intensity single, as low as a single photon. An SiPM device may use a digital counter to count incident photons until a threshold count of incident photons is reached. SiPMs are semiconductor photosensitive devices made up an array of Geiger-mode photon detection cells such as single photon avalanche diodes (SPADs) that are fabricated in a silicon substrate. Geiger-mode photon detection cells have a p-n junction biased beyond its breakdown voltage such that each electron-hole pair can trigger an avalanche multiplication process that translates to a discrete electric pulse. A single photon or multiple photons will not change the amplitude of the resultant pulse from a photon detection cell, since only a single photon is required to trigger an avalanche multiplication process. The avalanche is quenched, either actively or passively, which resets the photon detection cell so that it can detect further incident photons.

An increase in the bit-count of the digital counter would increase the accuracy and/or the count of incident photons, however, this would also increase the silicon area and power consumption required by the SiPM. A counter that requires a large silicon area may prevent an implementation of the circuit into a measurement device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
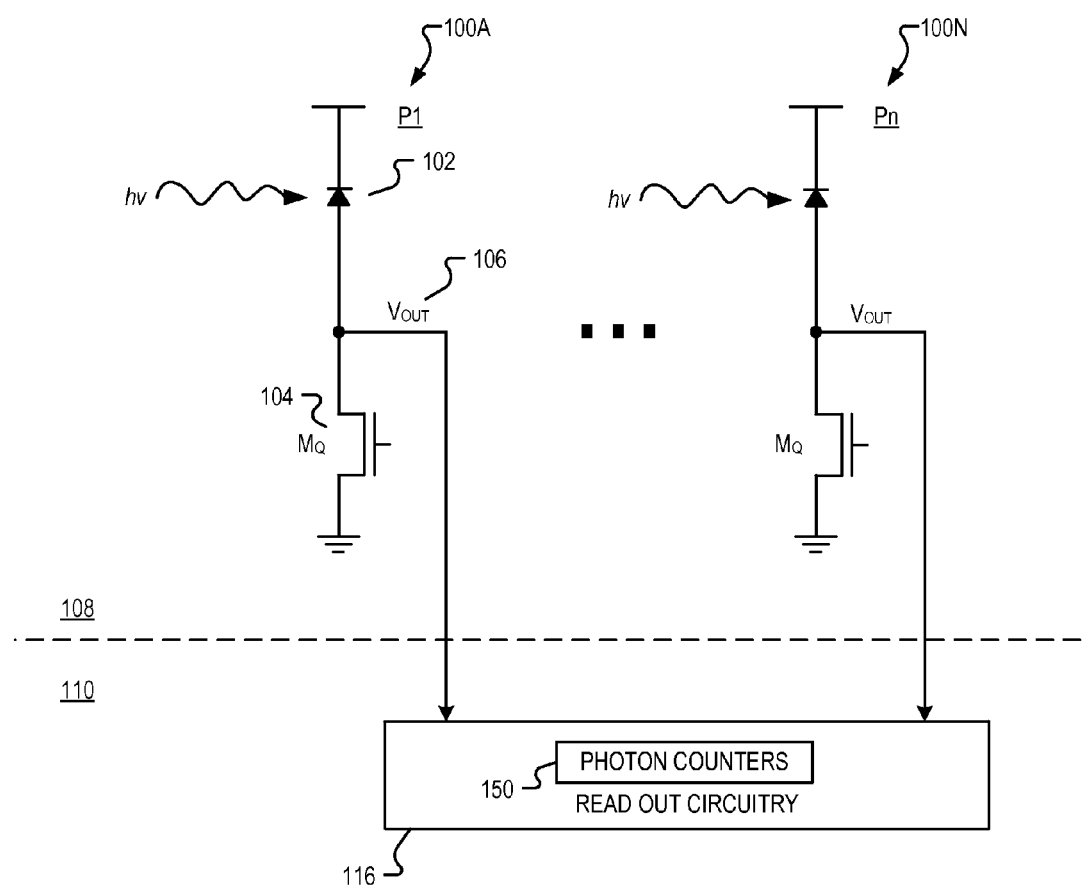
FIG. 1 is a schematic showing example pixels including single photon avalanche diodes (SPADs) coupled to photon counters in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe a low power imaging system including a pixel array having single photon avalanche diodes (SPADs) with photon counters. As will be discussed, an imaging system utilizing SPADs with photon counters in accordance with the teachings of the present invention makes possible both a global shutter and high dynamic range (HDR) imaging at the same time. In one example, chips included in the imaging system may be stacked in order to make mass production more practical. In various examples, power consumption is reduced substantially compared to other HDR applications that utilize SPAD photon counters.

To illustrate, assume that a SPAD output load capacitor has a capacitance of 10 fF, and an output swing of 3 V. For 60 fps speed with a 20 bit counter and a maximum counter rate of 60 MHz, the corresponding current would be 1.8 µA. Assuming further that a SPAD operates at 20V, the maximum power would be 36 µW per pixel. Thus, for a 1 megapixel image sensor, the corresponding power consumption would be 36 W, which would be unacceptably large for mass production, and would also dissipate excessive heat to be practical as well as degrade SPAD performance substantially.

FIG. 1 is a schematic showing example pixels coupled to photon counters, which may be utilized to provide a low power imaging system in accordance with the teachings of the present invention. In particular, the example depicted in FIG. 1 shows a plurality of pixels P1 100A to Pn 100N, which are included in a pixel array. In one example, the pixels P1 100A to Pn 100N are substantially similar to one another. As shown in the depicted example, pixel P1 100A includes a SPAD 102 coupled to a quenching element $M_Q$ 104. In the example, an output signal $V_{OUT}$ 106 indicates when a photon hv from incident light is detected. The output signals $V_{OUT}$ 106 are read out with read out circuitry 116, which in the illustrated example includes photon counters 150 that can count the number of photons detected by each pixel P1 100A to Pn 100N.

In the example shown in FIG. 1, it is appreciated that the pixel array including the plurality of pixels P1 100A to Pn 100N is included in a first chip 108, and that the read out circuitry 116 including the photon counters 150 is included in a second chip 110. In the example, the first chip 108 and second chip 110 are stacked to together. It is appreciated that by including the plurality of pixels P1 100A to Pn 100N on a separate chip 108 from the read out circuitry in second chip 110, mass production of an imaging system including the plurality of pixels P1 100A to Pn 100N and the photon counters 150 of read out circuitry 116 is more practical in accordance with the teachings of the present invention.

Figure 2:
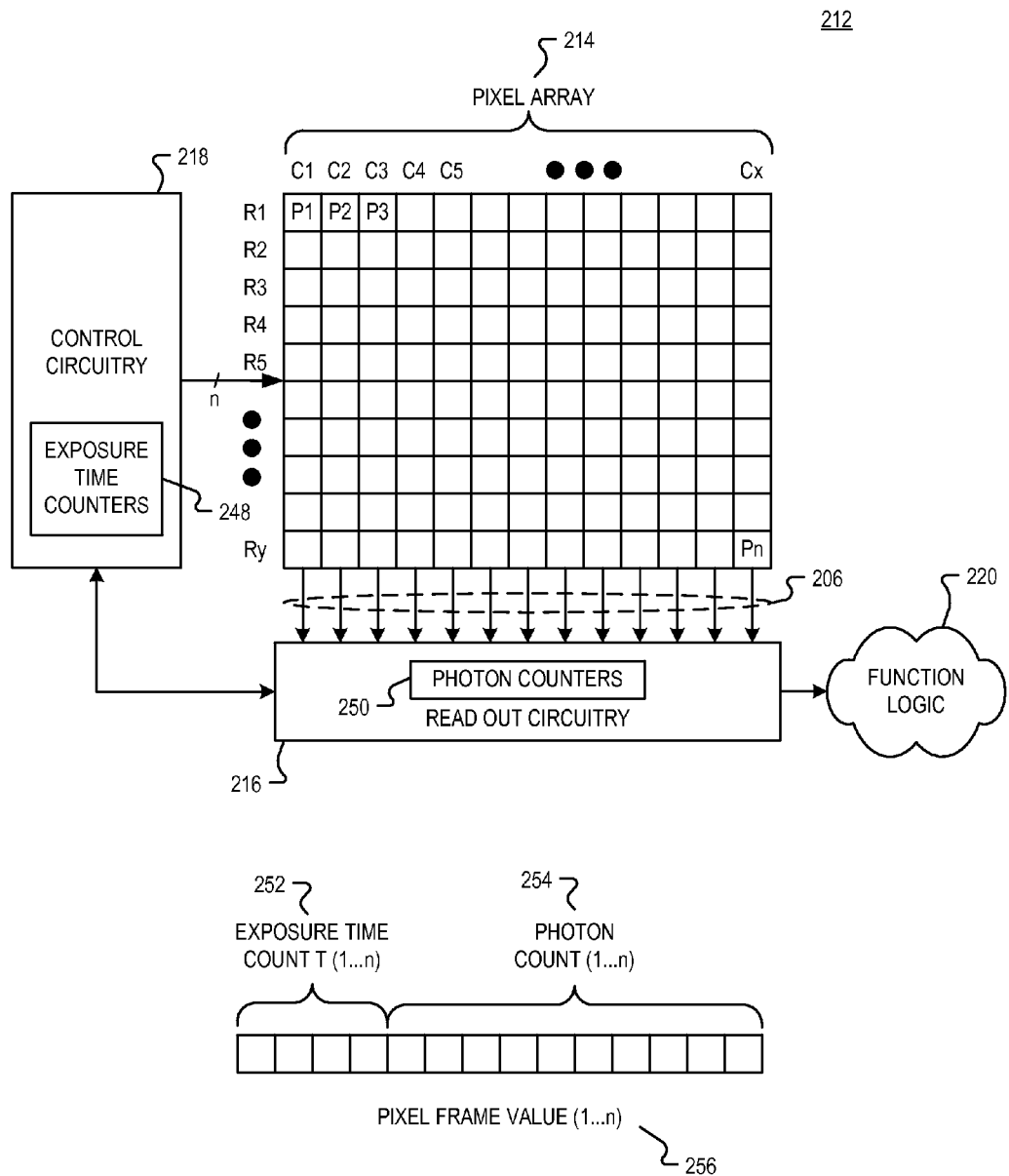
FIG. 2 is a diagram showing an example imaging system including an example pixel array having SPADs coupled to exposure time counters and photon counters in accordance with the teachings of the present invention.

FIG. 2 is a diagram showing an imaging system 212 including an example pixel array having SPADs coupled to exposure time counters and photon counters in accordance with the teachings of the present invention. In particular, as shown in the depicted example, imaging system 212 includes pixel array 214 coupled to control circuitry 218 and read out circuitry 216 including photon counters 250 that are coupled to function logic 220. In one example, pixel array 214 is a two-dimensional (2D) array of image sensor pixels (e.g., pixels P1, P2, P3, . . . , Pn). It is noted that the pixels P1, P2, . . . Pn in the pixel array 214 of FIG. 2 may be examples of pixel cells P1 100A to Pn 100N of FIG. 1, and that read out circuitry 216 and photon counters 250 of FIG. 2 may be examples of read out circuitry 116 and photon counters 150 of FIG. 1, and that similarly named and numbered elements referenced below are coupled and function similar to as described above. As illustrated, pixels P1 . . . Pn are arranged into a plurality of rows (e.g., rows R1 to Ry) and a plurality of columns (e.g., column C1 to Cx) to acquire image data of a person, place, object, etc., which can then be used to render a 2D image of the person, place, object, etc.

In one example, after photon counters 250 have counted photons that have been detected by each pixel cell P1, P2, P3, . . . , Pn, the photon count image data read out by read out circuitry 216 through output signals 206 can then be transferred to function logic 220. Function logic 220 may simply store the image data, or even manipulate the image data by applying post image effects (e.g., crop, rotate, remove red eye, adjust brightness, adjust contrast, or otherwise). In one example, control circuitry 218 is coupled to pixel array 214 to control operational characteristics of pixel array 214. In one example, control circuitry 218 is coupled to generate a global shutter signal for controlling photon counting and image acquisition for each pixel cell. In the example, the global shutter signal simultaneously enables all pixels P1, P2, P3, . . . Pn within pixel array 214 to simultaneously enable all of the pixels in pixel array 214 to start counting the number of incident photons detected during a single frame.

As shown in the depicted example, control circuitry 218 also includes exposure time counters 248, which as will be discussed in further detail below, are used to count the exposure times that photon counters 250 are enabled to count photons detected in each pixel P1, P2, P3, . . . Pn in pixel array 214 during a frame or sub-frame of pixel array 214 in accordance with the teachings of the present invention. In one example, after the photons have been counted for each pixel P1, P2, P3, . . . Pn of pixel array 214, the respective exposure times 252 and a photon counts 254 for pixels P1, P2, P3, . . . Pn are combined to form a pixel frame value 256, or in another example a pixel sub-frame value, in accordance with the teachings of the present invention.

Figure 3:
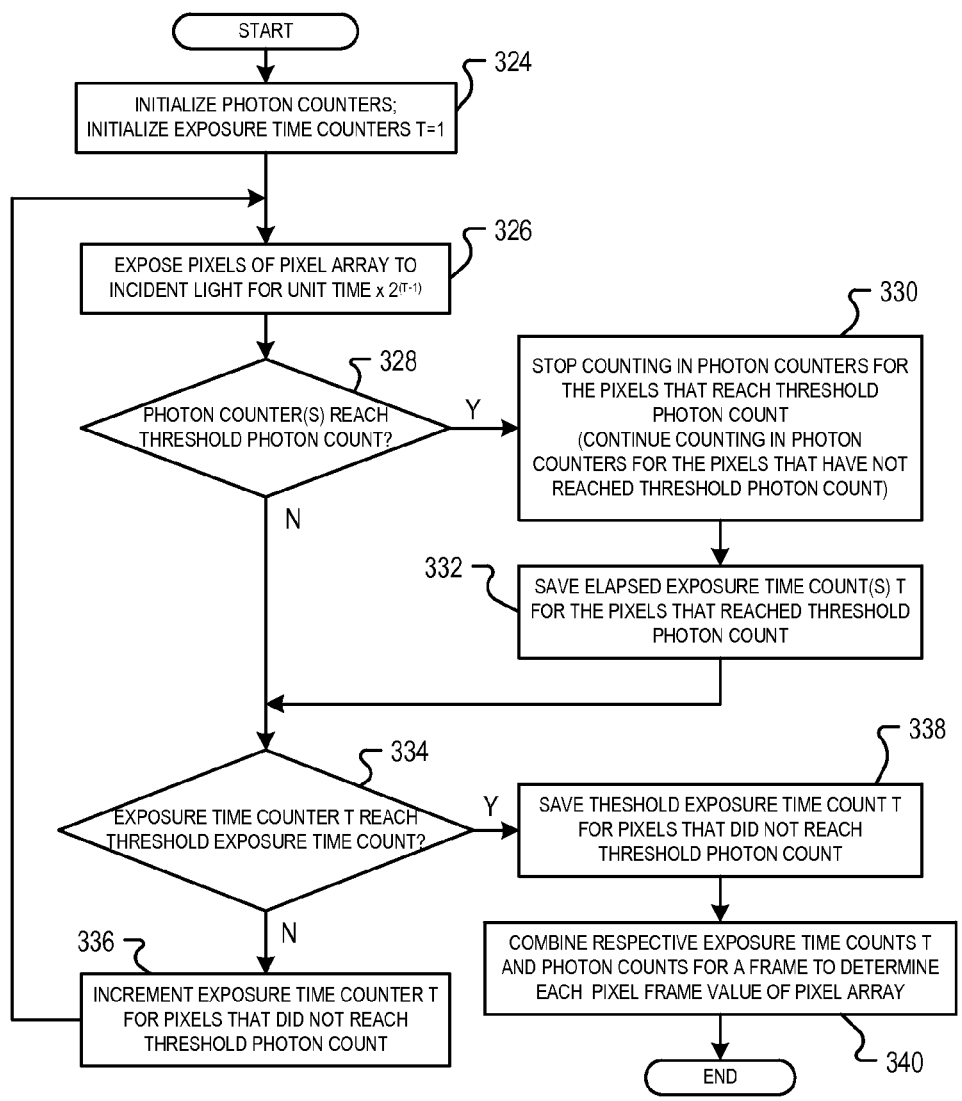
FIG. 3 is an example flow chart illustrating processing to operate one example of an imaging system including a pixel array having SPADs coupled to exposure time counters and photon counters in accordance with the teachings of the present invention.

To illustrate, FIG. 3 is an example flow chart 322 illustrating the processing performed to operate one example an imaging system, such as for example imaging system 212 of FIG. 2 including pixel array 214 having pixels with SPADs coupled to exposure time counters 248 and photon counters 250 in accordance with the teachings of the present invention.

As shown in the example of FIG. 3, processing begins at process block 324 where the photon counters are initialized to zero and the exposure time counters are initialized to one. At process block 326, the pixels are exposed to incident light for a unit time $\times 2^{(T-1)}$. In one example, the unit time when determining pixel frame values may be for example 16 µs. At decision block 328, it is determined whether or not any of the respective photon counters for the pixels P1, P2, P3, . . . Pn have reached a threshold photon count. In one example, the threshold photon count when determining pixel frame values may be for example 512 photons. If the photon counters have not reached the threshold photon count (e.g., 512 photons), then processing continues to decision block 334. However, if the a respective photon counter for a pixel has reached the threshold photon count (e.g., 512 photons), then process block 330 shows that the counting for that pixel is stopped or disabled, and process block 332 shows that the elapsed exposure time count for that pixel that reached the threshold photon count (e.g., 512 photons) is then saved.

Decision block 334 shows that it is next determined whether an exposure time counter T has reached a threshold exposure time count. In one example, the threshold exposure time count is T=11 for the frame of the pixel array, which in the example corresponds to a total of up to 16 ms (i.e., 16 µs$\times 2^{(11-1)}$) of exposure time. If the exposure time counters T have not reached the threshold exposure time (e.g., T=11), then processing continues to process block 336, where the exposure time counters are incremented for the pixels that did not reach the threshold photon count (e.g., 512 photons). Once the exposure time counters T are incremented in process block 336, processing then loops back to process block 326, wherein the pixels are further exposed to the incident light for additional exposure time. In the illustrated example, each additional exposure increases the total exposure time elapsed for that pixel by a factor of 2.

The counting of photons during each exposure time continues to loop as described above until it is determined in decision block 334 that the exposure time counters have reached the threshold exposure time count (e.g., T=11). Once the threshold exposure time count (e.g., T=11) has been reached, process block 338 shows that the threshold exposure time count T (e.g., T=11) is saved for each pixel that did not reach the threshold photon count (e.g., 512 photons). Process block 340 shows that the respective exposure time counts T and photon counts are combined for each pixel. As shown in the example in FIG. 2, respective exposure time counts T (1 . . . n) 252 are combined with respective photon counts (1 . . . n) 254 to form a pixel frame value (1 . . . n) 256 for each pixel for a frame in accordance with the teachings of the present invention.

An example of performing the processing steps of flow chart 322 may be illustrated as follows. Assuming the pixels are initially exposed to incident light for the unit time of 16 µs (i.e., 16 µs$\times 2^{(1-1)}$), if some pixel counter counts to the threshold photon count of 512 photons during this exposure time, then counting in that pixel is stopped and the exposure time count of T=1 (4 bit binary 0001) is saved for that pixel. Counting in the other pixels will continue.

Assuming that it takes 32 µs (i.e., 16 µs$\times 2^{(2-1)}$) for exposure time counter to be incremented to T=2, if a pixel counter counts to the threshold photon count of 512 photons, then counting in that pixel is stopped and the exposure time count of T=2 (4 bit binary 0010) is saved for that pixel. Counting in the other pixels will continue.

Assuming that it takes 64 µs (i.e., 16 µs×$2^{(3-1)}$) for exposure time counter to be incremented to T=3, if a pixel counter counts to the threshold photon count of 512 photons, then counting in that pixel is stopped and the exposure time count of T=3 (4 bit binary 0011) is saved for that pixel. Counting in the other pixels will continue.

Continuing with the example, assuming that it takes 8 ms (i.e., 16 µs×$2^{(10-1)}$) for exposure time counter to be incremented to T=10, if a pixel counter counts to the threshold photon count of 512 photons, then counting in that pixel is stopped and the exposure time count of T=10 (4 bit binary 1010) is saved for that pixel. Counting in the other pixels will continue.

When 16 ms (i.e., 16 µs×$2^{(11-1)}$) have elapsed, counting is stopped and the exposure time count of T=11 (4 bit binary 1011) is saved for that pixel.

Finally, the respective exposure time counts T and the photon counts are combined for each pixel. In one example, the respective exposure time counts T and the photon counts are combined to form corresponding pixel frame values for each pixel of the pixel array.

It is appreciated that in the example described above, with the 4 bit binary exposure time counter T values 0000 to 1011, a total of 11 exposure time values are utilized in the example to increase the dynamic range by 10 bits. In addition, a 10 bit counter is also utilized to count photons up to the threshold photon count of 512, which provides a 10 bit counter dynamic range. Therefore, combining the 4 bits of the exposure time counter with the 10 bits of the photon counter for the pixel frame value, provides a 20 bit range with only 14 bits in accordance with the teachings of the present invention.

Compared to the 1 megapixel example discussed previously that had a maximum counter rate of 60 MHz and consumed 36 W in order operate, the presently described example can still provide a 60 fps image sensor with 20 bit dynamic range, but consumes substantially less power of 36 mW instead of 36 W since the photon counters in accordance with the teachings of the present invention count up to 10 bit values and therefore only need a maximum counter rate of 60 KHz. Therefore, power consumption is reduced by a factor of $2^{10}$, or 1000 times less in accordance with the teachings of the present invention.

In other examples, it is appreciated that an extra latch may be added at the end of the counter to prevent counter overflow. In yet another example, it is appreciated that a 12 bit counter can be used for photon counter provide additional dynamic margin.

Figure 4:
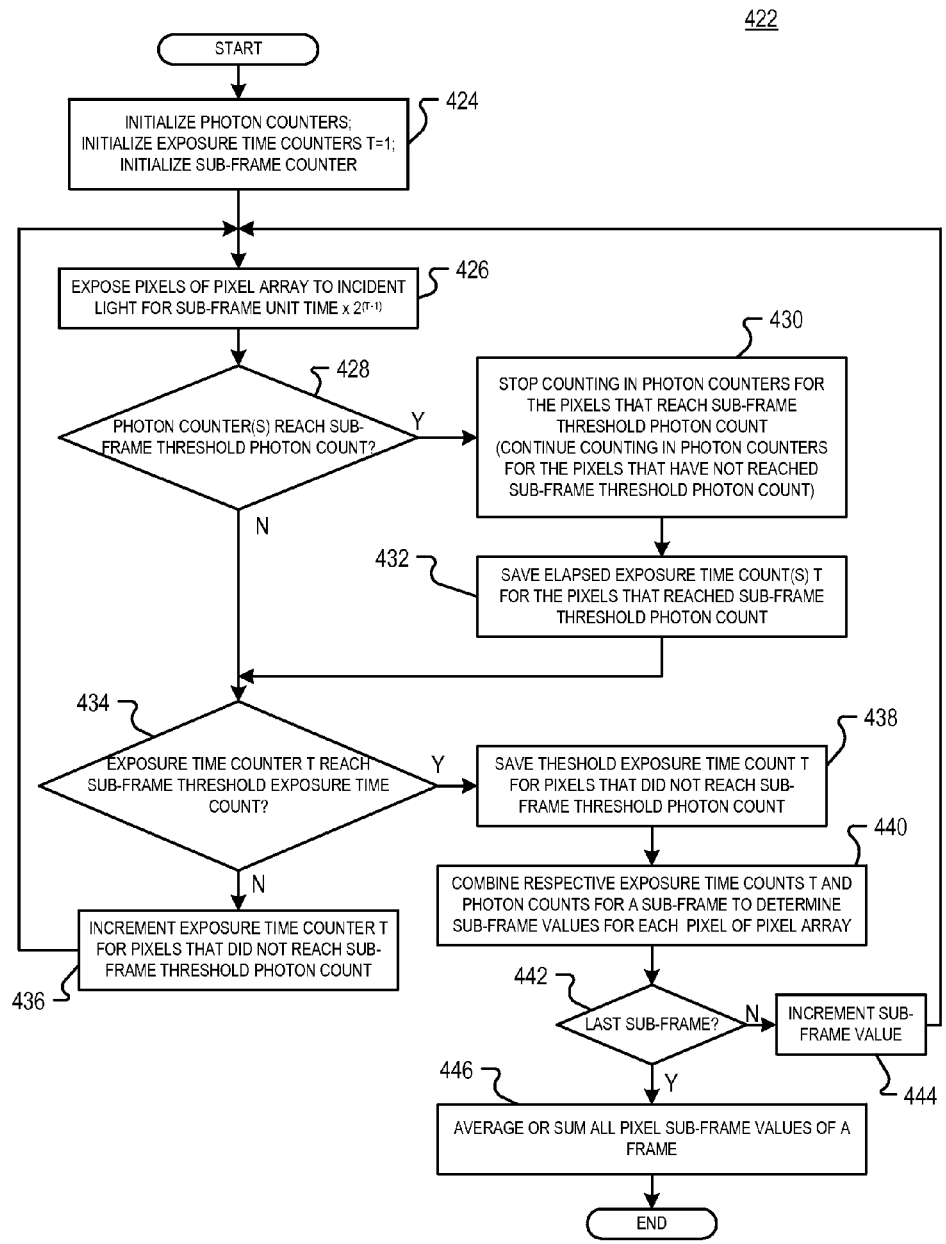
FIG. 4 is another example flow chart illustrating processing to operate one example of an imaging system including a pixel array having SPADs coupled to exposure time counters and photon counters in accordance with the teachings of the present invention.

FIG. 4 is another example flow chart 422 illustrating processing to operate one example of a pixel array including SPADs coupled to exposure time counters and photon counters in accordance with the teachings of the present invention. It is appreciated that flow chart 422 of FIG. 4 shares many similarities with flow chart 322 of FIG. 3 and that similarly numbered elements and processing blocks may perform similar functions. The example flow chart 422 of FIG. 4 illustrates processing that may be performed by an imaging system such as for example imaging system 212 of FIG. 2 including pixel array 214 having pixels with SPADs coupled to exposure time counters 248 and photon counters 250 to reduce ghosting in accordance with the teachings of the present invention.

In particular, an unwanted ghost image may occur when an object moves quickly, but the time of exposures are different for the different pixels in the pixel array. For instance, as described in the example discussed above in FIG. 3, each pixel of the pixel array may have a different exposure time. This may cause a ghost image for quickly moving objects. In the example described in flow chart 422 of FIG. 4, the exposure for each frame is divided into a plurality of sub-frames. For instance, in the example described in FIG. 4, each frame is divided into 16 pixel sub-frame values. By dividing the exposure into 16 parts or sub-frames, the overall exposure times can be shorter and therefore be more uniformly distributed across the entire frame. The final image can then constructed by averaging all 16 of the sub-frames to determine averaged pixel frame values for each of the pixels in the pixel array in accordance with the teachings of the present invention.

To illustrate, as shown in the example of FIG. 4, processing begins at process block 424 where the photon counters are initialized to zero, the exposure time counters are initialized to one, and the sub-frame counters are initialized to one. At process block 426, the pixels are exposed to incident light for a unit time×$2^{(T-1)}$. In one example, the unit time when determining pixel sub-frame values may be for example 1 µs. At decision block 428, it is determined whether or not any of the respective photon counters for the pixels P1, P2, P3, . . . Pn have reached a threshold photon count. In one example, the sub-frame threshold photon count when determining pixel sub-frame values may be for example 32 photons. If the photon counters have not reached the sub-frame threshold photon count (e.g., 32 photons), then processing continues to decision block 434. However, if the a respective photon counter for a pixel has reached the sub-frame threshold photon count (e.g., 32 photons), then process block 430 shows that the counting for that pixel is stopped or disabled, and process block 432 shows that the elapsed exposure time count for that pixel that reached the sub-frame threshold photon count (e.g., 32 photons) is then saved.

Decision block 434 shows that it is next determined whether an exposure time counter T has reached a sub-frame threshold exposure time count. In one example, the sub-frame threshold exposure time count is T=11 for the sub-frame of the pixel array, which in the example corresponds to a total of up to 1 ms (i.e., 1 µs×$2^{(11-1)}$) of exposure time. If the exposure time counters T have not reached the sub-frame threshold exposure time (e.g., T=11), then processing continues to process block 436, where the exposure time counters are incremented for the pixels that did not reach the sub-frame threshold photon count (e.g., 32 photons). Once the exposure time counters T are incremented in process block 436, processing then loops back to process block 426, wherein the pixels are further exposed to the incident light for additional exposure time. In the illustrated example, each additional exposure increases the total exposure time elapsed for that pixel by a factor of 2.

The counting of photons during each exposure time continues to loop as described above until it is determined in decision block 434 that the exposure time counters have reached the threshold exposure time count (e.g., T=11). Once the sub-frame threshold exposure time count (e.g., T=11) has been reached, process block 438 shows that the threshold exposure time count T (e.g., T=11) is saved for each pixel that did not reach the sub-frame threshold photon count (e.g., 32 photons). Process block 440 shows that the respective exposure time counts T and photon counts are combined for each pixel. Similar to the example described in FIG. 2, respective exposure time counts T (1 . . . n) 252 are combined with respective photon counts (1 . . . n) 254 to form a pixel sub-frame value (1 . . . n) 256 for each pixel for a sub-frame in accordance with the teachings of the present invention.

Decision block 442 shows that it is determined whether there are any more sub-frames left to process in the frame. If not, then process block 444 shows that the sub-frame value is incremented and then processing loops back to process block 426. However, if all sub-frames have been processed, then process block 446 shows that all of the pixel sub-frame values of the frame are then averaged to determine an averaged pixel frame value of the pixel array. In one example, all sub-frames may be summed together to obtain a summed pixel frame value of the pixel array.

An example of performing the processing steps of flow chart 422 may be illustrated as follows. Assuming the pixels are initially exposed to incident light for the unit time of 1 μs (i.e., 1 μs×$2^{(1-1)}$), if some pixel counter counts to the threshold photon count of 32 photons during this exposure time, then counting in that pixel is stopped and the exposure time count of T=1 (4 bit binary 0001) is saved for that pixel. Counting in the other pixels will continue.

Assuming that it takes 2 μs (i.e., 1 μs×$2^{(2-1)}$) for exposure time counter to be incremented to T=2, if a pixel counter counts to the threshold photon count of 32 photons, then counting in that pixel is stopped and the exposure time count of T=2 (4 bit binary 0010) is saved for that pixel. Counting in the other pixels will continue.

Assuming that it takes 4 μs (i.e., 1 μs×$2^{(3-1)}$) for exposure time counter to be incremented to T=3, if a pixel counter counts to the threshold photon count of 32 photons, then counting in that pixel is stopped and the exposure time count of T=3 (4 bit binary 0011) is saved for that pixel. Counting in the other pixels will continue.

Continuing with the example, assuming that it takes 512 μs (i.e. 1 μs×$2^{(10-1)}$) for exposure time counter to be incremented to T=10, if a pixel counter counts to the threshold photon count of 32 photons, then counting in that pixel is stopped and the exposure time count of T=10 (4 bit binary 1010) is saved for that pixel. Counting in the other pixels will continue.

When 1 ms (i.e. 1 μs×$2^{(11-1)}$) have elapsed, counting is stopped and the exposure time count of T=11 (4 bit binary 1011) is saved for that pixel.

Finally, the respective exposure time counts T and the photon counts are combined for each pixel. In one example, the respective exposure time counts T and the photon counts are combined to form corresponding pixel sub-frame values for each pixel of the pixel array. After all 16 sub-frames of the frame have been processed, all 16 of the pixel sub-frame values are averaged to determine an averaged pixel frame value for the frame in accordance with the teachings of the present invention. As mentioned previously, the averaged or summed pixel frame values will reduce ghost images in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An imaging system, comprising:
a pixel array including a plurality of pixels, wherein each one of the plurality of pixels includes a single photon avalanche diode (SPAD) coupled to detect photons in response to incident light;
a plurality of photon counters included in readout circuitry, wherein each one of the plurality of photon counters is coupled to a respective one of the plurality of pixels to count a number of photons detected by said respective one of the plurality of pixels, wherein each one of the plurality of photon counters is coupled to stop counting photons for said respective one of the plurality of pixels that reaches a threshold photon count, and wherein each one of the plurality of photon counters is coupled to continue counting photons for said respective one of the plurality of pixels that does not reach the threshold photon count;
control circuitry coupled to the pixel array to control operation of the pixel array, the control circuitry including an exposure time counter coupled to count an exposure time elapsed before each one of the plurality of pixels detects the threshold photon count, wherein respective exposure time counts and photon counts are combined for each one of the plurality of pixels of the pixel array.

2. The imaging system of claim 1 further comprising function logic coupled to the read out circuitry to store image data read out from the plurality of pixels.

3. The imaging system of claim 1 wherein each one of the plurality of pixels further includes a quenching element coupled to each SPAD.

4. The imaging system of claim 1 the plurality of pixels in the pixel array are arranged into a plurality of rows and a plurality of columns.

5. The imaging system of claim 1 wherein the pixel array is included in a first chip and wherein the read out circuitry is included in a second chip, wherein the first and second chips are stacked together.

6. The imaging system of claim 1 wherein the respective exposure time counts and photon counts are combined for each one of the plurality of pixels of the pixel array to determine pixel frame values for each one of the plurality of pixels of the pixel array.

7. The imaging system of claim 1 wherein the respective exposure time counts and photon counts are combined for each one of the plurality of pixels of the pixel array to determine pixel sub-frame values for each one of the plurality of pixels of the pixel array.

8. The imaging system of claim 7 wherein an averaged pixel frame value is an average of all pixel sub-frame values for a frame for each one of the plurality of pixels of the pixel array.

9. The imaging system of claim 1 wherein the exposure time elapsed increases by a factor of 2 each time the exposure time counter is incremented.

10. A method of operating a pixel array, comprising:
exposing a plurality of pixels of a pixel array to incident light;
counting photons detected by each one of the plurality of pixels with a respective photon counter of a plurality of photon counters;
stopping counting of photons in the respective photon counter of the plurality of photon counters for each one of the plurality of pixels that reaches a threshold photon count;

continuing counting of photons in the respective photon counter of the plurality of photon counters for each one of the plurality of pixels that does not reach the threshold photon count;

saving an elapsed exposure time count for the plurality of pixels that reached the threshold photon count;

saving a threshold exposure time count for the plurality of pixels that did not reach the threshold photon count after an exposure time counter has reached the threshold exposure time count; and combining respective exposure time counts and photon counts for each one of the plurality of pixels of the pixel array.

11. The method of claim 10 further comprising incrementing the exposure time counter after each exposure for the plurality of pixels that did not reach the threshold photon count until the exposure time counter reaches the threshold exposure time count.

12. The method of claim 11 wherein an exposure time elapsed increases by a factor of 2 each time the elapsed exposure time count is incremented.

13. The method of claim 10 further comprising initializing the plurality of photon counters prior to counting the photons.

14. The method of claim 10 further comprising initializing exposure time counters prior to counting the photons.

15. The method of claim 10 wherein the respective exposure time counts and photon counts are combined for each one of the plurality of pixels of the pixel array to determine pixel frame values for each one of the plurality of pixels of the pixel array.

16. The method of claim 10 further comprising initializing a sub-frame counter prior to counting the photons.

17. The method of claim 10 wherein the respective exposure time counts and photon counts are combined for each one of the plurality of pixels of the pixel array to determine pixel sub-frame values for each one of the plurality of pixels of the pixel array.

18. The method of claim 17 further comprising averaging all pixel sub-frame values for a frame for each one of the plurality of pixels of the pixel array to determine an averaged pixel frame value for each one of the plurality of pixels of the pixel array.

* * * * *